United States Patent Office 3,803,200
Patented Apr. 9, 1974

3,803,200
METHYLSULFONYLMETHANESULFONIC ACID ALKYLENE ESTERS
Alexander Senning, Brabrand, Denmark, and Robert Bierling, Wuppertal-Elberfeld, Dieter Steinhoff, Bochum, and Gerhard Trossmann, Bonn-Bad Godesberg, Germany, assignors to Farbenfabriken Bayer AG, Leverkusen, Germany
No Drawing. Filed Sept. 14, 1971, Ser. No. 180,496
Claims priority, application Germany, Sept. 18, 1970, P 20 46 089.3
Int. Cl. C07c 141/02
U.S. Cl. 260—456 R                 8 Claims

ABSTRACT OF THE DISCLOSURE $\alpha,\omega$-Bis(methylsulfonylmethylsulfonyloxy)alkanes having up to and including 14 carbon atoms in the alkane group are cytostatic agents. The compounds, of which 1,3-bis(methylsulfonylmethylsulfonyloxy)propane is a representative embodiment, are prepared from $\alpha,\omega$-diiodoalkane of up to 14 carbon atoms and silver methylsulfonylmethanesulfonate.

DETAILED DESCRIPTION

The present invention relates to novel aliphatic sulfonic acid diesters, to their preparation, to their use as cytostatic agents and to compositions adapted to that use.

In particular, the present invention pertains to compounds of the formula:

$$CH_3-SO_2-CH_2-SO_2-O-(CH_2)_n-O-SO_2-CH_2-SO_2-CH_3 \quad (I)$$

wherein $n$ has a value of from 1 to 14.

The integer $n$ preferably has a value of from 3 to 12.

The new sulfonic acid esters are obtained if an $\alpha,\omega$-diiodoalkane of Formula II $$I-(CH_2)_n-I \quad (II)$$

wherein $n$ is as defined above, is allowed to react with about the stoichiometric amount of silver methylsulfonylmethanesulfonate at temperatures in the range of from about $-100°$ to about $100°$ C., in the presence of an organic diluent. In the reaction, the reactants are preferably employed in approximately the stoichiometrically required amounts.

The reaction is carried out in the temperature range of from about $-100°$ to about $100°$ C., preferably at about $-20°$ to $30°$ C., preferably in the presence of an organic diluent. Polar aprotic solvents, such as anhydrous acetonitrile, are preferentially employed.

The diiodo compounds II which serve as the starting compounds are known. Silver methylsulfonylmethanesulfonate which serves as the other starting compound can be manufactured from methanesulfonyl chloride through the formation of sodium methylsulfonylmethanesulfonate.

The reaction leading to the compounds of Formula I to the invention can be typified by the following equation:

$$2CH_3-SO_2-CH_2-CO_2^-Ag^+ + I-(CH_2)_n-I \longrightarrow$$
<div style="text-align:center">III      II</div>

$$CH_3-SO_2-CH_2-SO_2-O-(CH_2)_n-O-SO_2-CH_2-SO_2-CH_3 + 2AgI$$
<div style="text-align:center">I</div>

The manufacture of the new compounds will be explained with the aid of the following examples:

Example 1

A mixture of 22.48 g. of silver methylsulfonylmethanesulfonate, 100 ml. of anhydrous acetonitrile and 14.64 g. of 1,8-diiodooctane (II; $n=8$) is stirred for 7 hours at room temperature (about 22° C.) and is subsequently left to stand overnight. The silver iodide which separates out is filtered off, and the filtrate is concentrated in vacuo. The residue is twice recrystallized from chloroform. 9.7 g. of methylsulfonylmethanesulfonic acid octamethylene ester, alternatively named as 1,8-bis(methylsulfonylmethylsulfonyloxy)octane, of melting point 89–92° C. are thus obtained.

Silver methylsulfonylmethanesulfonate is obtained as follows: 114.0 g. of methanesulfonyl chloride are added dropwise over the course of 30 minutes to a mixture of 210 ml. of triethylamine and 400 ml. of anhydrous acetonitrile, at $-40°$ C., while stirring. The mixture is stirred for a further hour at $-40°$ C. and 9.0 ml. of water are added, again at $-40°$ C. After a further 15 minutes' stirring at $-40°$ C., the mixture is filtered and the filtrate is concentrated in vacuo. After adding 500 ml. of 2 N sodium hydroxide, 60 g. of crystals of melting point 235–240° C. are obtained, and these are filtered off. After recrystallization from ethanol/water, sodium methylsulfonylmethanesulfonate melts between 239° and 241° C. 40 g. of sodium methylsulfonylmethanesulfonate are dissolved in 1 liter of water and the solution is passed through an ion exchanger column with a polystyrene synthetic resin containing sulfonic acid groups as the ion exchanger. The aqueous solution of the free methylsulfonylmethanesulfonic acid is digested with 69 g. of silver carbonate, whereupon 40 g. of silver carbonate remain undissolved and are filtered off. The filtrate is concentrated in vacuo, with the bath temperature not exceeding 60° C. After adding methanol, 45 g. of crystalline silver methylsulfonylmethanesulfonate of melting point 186–190° C. are obtained.

The following compounds are substituted for 1,8-diiodooctane in the procedure of Example 1:

| Example: | Starting material |
|---|---|
| 2 | 1,3-diiodopropane. |
| 3 | 1,4-diiodobutane. |
| 4 | 1,5-diiodopentane. |
| 5 | 1,6-diiodohexane. |
| 6 | 1,7-diiodoheptane. |
| 7 | 1,9-diiodononane. |
| 8 | 1,10-diiododecane. |
| 9 | 1,11-diiodoundecane. |
| 10 | 1,12-diiodododecane. |

The following compounds are respectively obtained:

| Example | Compound | Melting point (° C.) |
|---|---|---|
| 2 | $CH_3-SO_2-CH_2-SO_2-O-(CH_2)_3-O-SO_2-CH_2-SO_2-CH_3$ | 136–139 |
| 3 | $CH_3-SO_2-CH_2-SO_2-O-(CH_2)_4-O-SO_2-CH_2-SO_2-CH_3$ | 132–135 |
| 4 | $CH_3-SO_2-CH_2-SO_2-O-(CH_2)_5-O-SO_2-CH_2-SO_2-CH_3$ | 101–106 |
| 5 | $CH_3-SO_2-CH_2-SO_2-O-(CH_2)_6-O-SO_2-CH_2-SO_2-CH_3$ | 103–106 |
| 6 | $CH_3-SO_2-CH_2-SO_2-O-(CH_2)_7-O-SO_2-CH_2-SO_2-CH_3$ | 75–90 |
| 7 | $CH_3-SO_2-CH_2-SO_2-O-(CH_2)_9-O-SO_2-CH_2-SO_2-CH_3$ | 64–68 |
| 8 | $CH_3-SO_2-CH_2-SO_2-O-(CH_2)_{10}-O-SO_2-CH_2-SO_2-CH_3$ | 103–105 |
| 9 | $CH_3-SO_2-CH_2-SO_2-O-(CH_2)_{11}-O-SO_2-CH_2-SO_2-CH_3$ | 60–77 |
| 10 | $CH_3-SO_2-CH_2-SO_2-O-(CH_2)_{12}-O-SO_2-CH_2-SO_2-CH_3$ | 109–111 |

As already mentioned, the new compounds show good cytostatic activity.

The activity of the compounds according to the invention can be conveniently observed in the model of transplanted lymphatic leukemia L 1210 on mice as follows:

Mice weighing 18–22 g. (strain B 6 D 2 F 1) were injected intraperitoneally $2\times 10^5$ leukemia cells (L 1210) in 0.2 mol of ascites fluid.

The treatment was carried out 4 times, on successive days, by intraperitoneal administration, and started 24 hours after the transplantation of the leukemia cells.

The duration of the test was 2–3 weeks.

To assess the results of the test, the survival time index (ST index) was determined as follows:

If the survival time 50 of the control group is treated as 100%, it is possible, using the formula $$\text{ST index} = \frac{\text{ST 50 of the treated group} \times 100}{\text{ST 50 of the control group}}$$

to compute a quotient which can be treated as an index of the change in the ST under the treatment.

Assessment: Values $<100\%$ denote a reduced survival time of the treated group of animals and hence a toxic action of the preparation.

Values $>100\%$ denote an increased survival time 50, which, depending on the level of the index, express an inhibition of the tumor growth.

The results are shown in Table 1.

TABLE 1

| | L 1210 Leukemia, optimum dose [1] | survival time index, percent |
|---|---|---|
| Comparison substance [2] | 50 | 106 |
| Compound from Example No.: | | |
| 1 | 10 | 313 |
| 2 | 5 | 218 |
| 3 | 10 | 193 |
| 4 | 20 | 169 |
| 5 | 12.5 | 218 |
| 6 | 10 | 247 |
| 7 | 20 | 165 |
| 8 | 125 | 124 |
| 9 | 60 | 287 |
| 10 | 500 | 133 |

[1] In mg./kg. of body weight, 4× intraperitoneally.
[2] The compound of the formula $CH_3-SO_2-O-(CH_2)_4-O-SO_2-CH_3$, from British Pat. No. 700,677, served as the comparison substance.

The new compounds are preferably administered orally and can be used either as such or in combination with non-toxic, inert, pharmaceutically tolerated excipients. Suitable forms for administration, in combination with various inert excipients, are tablets, dragees, capsules, granules, aqueous suspensions and emulsions, non-aqueous emulsions and suspensions, syrups and the like. Such excipients include solid diluents or fillers, aqueous media, as well as various non-toxic organic diluents and the like. Of course, tablets and the like can be provided with a sweetener and similar substances. The therapeutically active compound should, in the above mentioned case, be present in a concentration of about 0.5 to 90 percent by weight of the total mixture, in amounts which suffice to achieve dosage range which is cytostatically effective.

The formulations are manufactured according to conventional techniques, for example by extending the active substances with diluents and/or excipients, optionally using emulsifiers and/or dispersing agents, such as water, non-toxic organic solvents or diluents, such as paraffins, vegetable oils, such as groundnut oil and sesame oil, alcohols, such as ethyl alcohol or glycerol, glycols, such as propylene glycol or polyethylene glycol, solid excipients, such as, for example natural rock powders for example kaolins, aluminas, talc or chalk, synthetic rock powders, such as highly disperse silica and silicates, sugars as for example unrefined sugar, lactose and glucose; smulsifiers, such as non-ionic and anionic emulsifiers as for example polyoxyethylene-fatty acid esters, polyoxyethylene-fatty alcohol ethers, alkylsulfonates and arylsulfonates, dispersing agents, such as lignin, sulfite waste lyes, methylcellulose, starch and polyvinylpyrrolidone and lubricants, such as magnesium stearate, talc, stearic acid and sodium lauryl sulfate.

Apart from the excipients mentioned, tablets can of course also contain additives, such as sodium citrate, calcium carbonate and dicalcium phosphate, together with various further substances such as starch, preferably potato starch, gelatin and the like. Furthermore, lubricants such as magnesium stearate, sodium lauryl sulfate and talc can additionally be used for making tablets. In the case of suspensions and emulsions, the active substances can be mixed with various flavor improving agents or dyestuffs in addition to the above mentioned auxiliaries.

The active substances can also be contained in the form of dosage units in capsules, tablets, pastilles, dragees, ampoules and the like, each dosage unit being so adapted as to yield a single dose of the active constituent.

The new compounds can also be present in the formulations as mixtures with other known active substances.

In general it has proved advantageous to administer amounts of about 5 mg. to 50 mg./kg. of body weight per day to achieve cytostatically effective results. Nevertheless it will at times be necessary to deviate from the amounts mentioned, and in particular to do so as a function of the body weight of the test animal, the method of administration, the type of animal and its individual behavior towards the cytostatic agent, the type of formulation, and the administration regimen. Thus it will in some cases suffice to use less than the above mentioned minimum, while in others the upper limit mentioned must be exceeded. Where larger amounts are administered, it can be advisable to divide these into several individual administrations over the course of the day.

What is claimed is:

1. A compound of the formula:

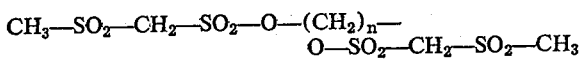

wherein $n$ has a value of from 1 to 14.

2. A compound according to claim 1, wherein $n$ has a value of from 3 to 12.

3. The compound according to claim 1, wherein $n$ is 8, said compound is of the formula:

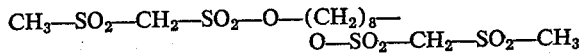

4. The compound according to claim 1, wherein $n$ is 3, said compound is of the formula:

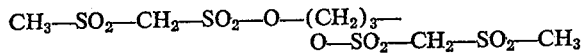

5. The compound according to claim 1, wherein $n$ is 4, said compound is of the formula:

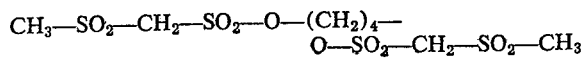

6. The compound according to claim 1, wherein $n$ is 6, said compound is of the formula:

$$CH_3-SO_2-CH_2-SO_2-O-(CH_2)_6-O-SO_2-CH_2-SO_2-CH_3$$

7. The compound according to claim 1, wherein $n$ is $$CH_3-SO_2-CH_2-SO_2-O-(CH_2)_7-O-SO_2-CH_2-SO_2-CH_3$$

8. The compound according to claim 1, wherein $n$ is 11, said compound is of the formula:

$$CH_3-SO_2-CH_2-SO_2-O-(CH_2)_{11}-O-SO_2-CH_2-SO_2-CH_3$$

References Cited

FOREIGN PATENTS 705,892  3/1965  Canada _____ 260—456
700,677  12/1953 Great Britain _____ 260—456

OTHER REFERENCES

Chem. Abstracts 64: 597c (1966).
Chem. Abstracts 49: 4558c (1955).

BERNARD HELFIN, Primary Examiner

N. MORGENSTERN, Assistant Examiner

U.S. Cl. X.R.

260—430, 652 R; 424—303